J. G. GRAHAM.

SHEET METAL DOUBLING MACHINE.

APPLICATION FILED DEC. 31, 1919.

Reissued July 6, 1920.

14,907.

3 SHEETS—SHEET 1.

INVENTOR

JOHN G. GRAHAM, by Ralph Kalish ATTORNEY.

J. G. GRAHAM.
SHEET METAL DOUBLING MACHINE.
APPLICATION FILED DEC. 31, 1919.
Reissued July 6, 1920. 14,907.
3 SHEETS—SHEET 2.
Fig. 3
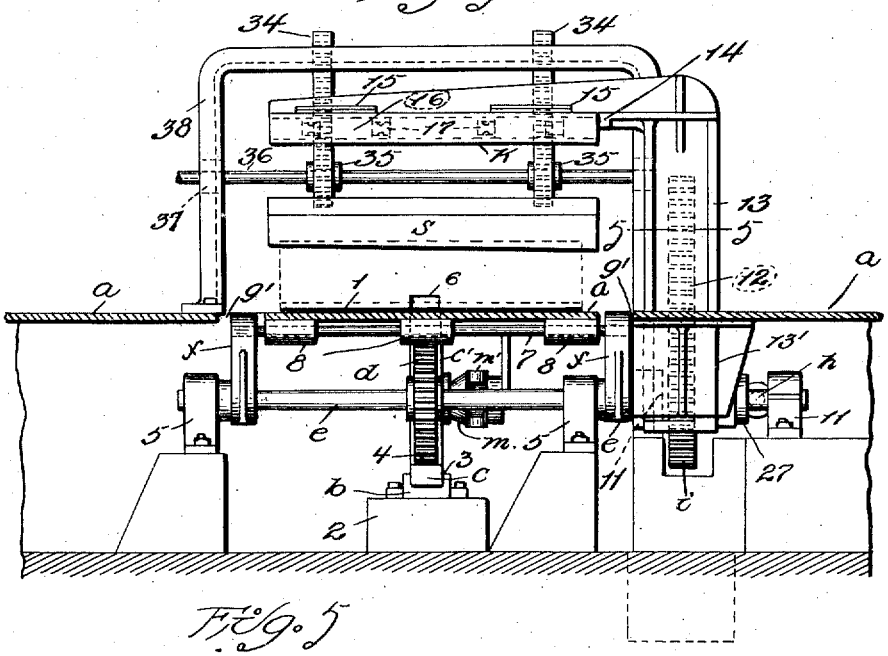
Fig. 5
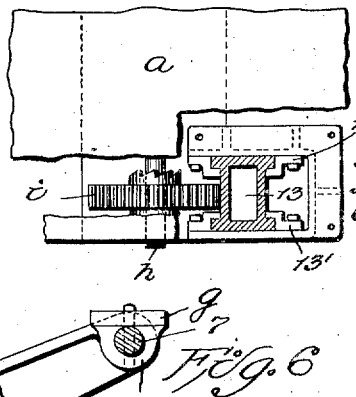
Fig. 4
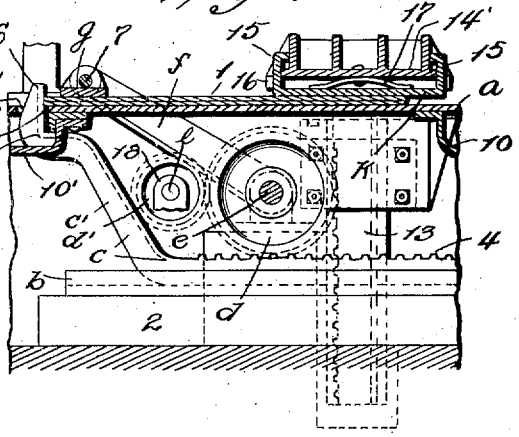
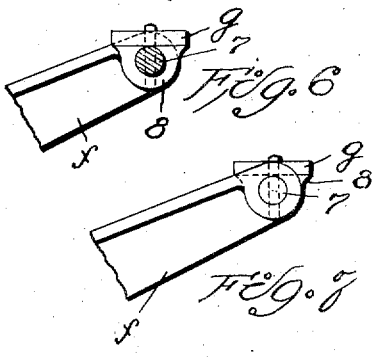
Fig. 6
Fig. 7
INVENTOR
JOHN G. GRAHAM,
by Ralph Kaish ATTORNEY.

J. G. GRAHAM.

SHEET METAL DOUBLING MACHINE.

APPLICATION FILED DEC. 31, 1919.

Reissued July 6, 1920.

14,907.

3 SHEETS—SHEET 3.

INVENTOR

JOHN G. GRAHAM, by Ralph Kerr Attorney.

UNITED STATES PATENT OFFICE.

JOHN G. GRAHAM, OF GRANITE CITY, ILLINOIS.

SHEET-METAL-DOUBLING MACHINE.

14,907. Specification of Reissued Letters Patent. Reissued July 6, 1920.

Original No. 1,252,270, dated January 1, 1918, Serial No. 151,479, filed February 28, 1917. Application for reissue filed December 31, 1919. Serial No. 348,683.

*To all whom it may concern:*

Be it known that I, JOHN G. GRAHAM, a citizen of the United States, residing at Granite City, county of Madison, and State of Illinois, have invented a new and useful Improvement in Sheet-Metal-Doubling Machines, of which the following is a specification, reference being had to the accompanying drawings forming a part thereof.

My invention relates to a machine for doubling sheet-metal. The principal object of my present invention is to provide a machine by which sheet-metal is readily, quickly, and efficiently automatically doubled for producing a pack of two or more sheets.

With the above and other objects in view, my invention resides in the novel features of form, construction, arrangement, and combination of parts hereinafter described and afterward pointed out in the claims.

In the accompanying drawings—

Fig. 3 is a vertical transverse section through the foundation of the machine, omitting the floor-plate, and showing the machine in front end elevation;

Fig. 4 is a view similar to Fig. 1, broken away, with the folding parts of the machine in different positions respectively;

Fig. 5 is a horizontal section through the shank and guides of the presser-plate and its appendages forming parts of my invention, on line 5—5, in Figs. 1 and 3;

Fig. 6 is a vertical cross section through a number of the folding parts of the machine, on line 6—6, in Fig. 2;

Fig. 7 is an end view of the same;

Figure 1:
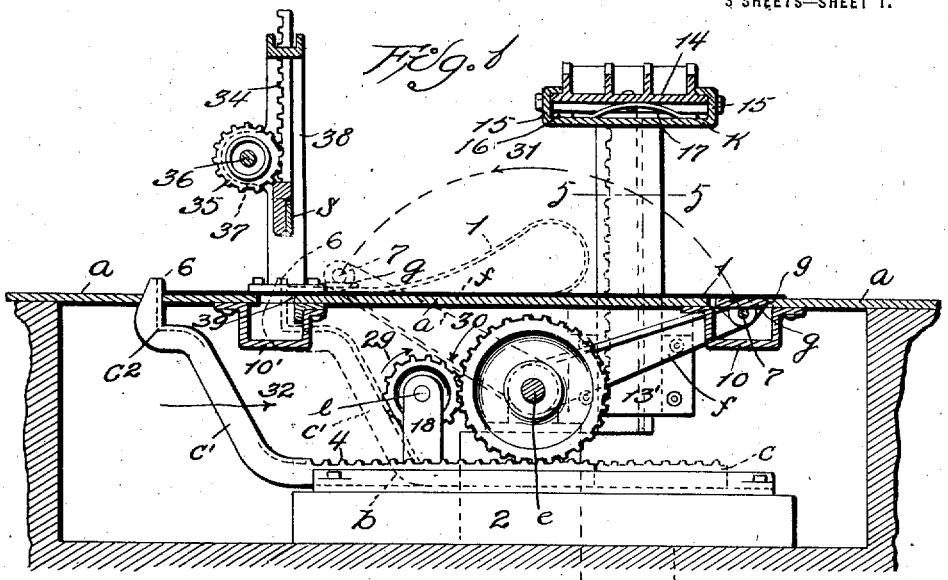
Figure 1 is a vertical longitudinal section through my improved sheet-metal doubling-machine, omitting parts of the driving gear.

Referring now more in detail to the said drawings in which like letters and numerals of reference denote like parts in all the figures, *a* represents a preferably metal floor-plate on which the metal sheet 1 (represented by the heavy black line in Figs. 1 and 3) to be doubled is laid. Beneath the floor-plate *a* is a bed 2 on which is fixed a block *b* having a channel or guide-way 3 in central alinement, or thereabout, longitudinally with the metal sheet 1, and in which is adapted to slide forward and rearward a rectangular-shaped bar *c* having across its upper face a series of teeth 4 which are adapted to be engaged by preferably a toothed spur wheel *d* fixed above the bar *c* (hereinafter termed rack) on a transversely arranged shaft *e*, which is mounted in suitable bearings 5 secured to the foundation of the machine beneath the shaft *e*. From the rear end portion, and in the vertical plane, of the rack *c*, extends an upwardly and preferably rearwardly inclined member $c'$, which is formed at its upper end with a rearwardly projecting L-shaped offset $c^2$ having its vertical leg 6 projecting upward through the floor-plate *a* and being adapted to bear at its front side against the rear end edge of the metal-sheet 1 when the latter is in its initial position on the floor-plate *a*, as seen particularly in Figs. 1 and 2.

Figure 2:
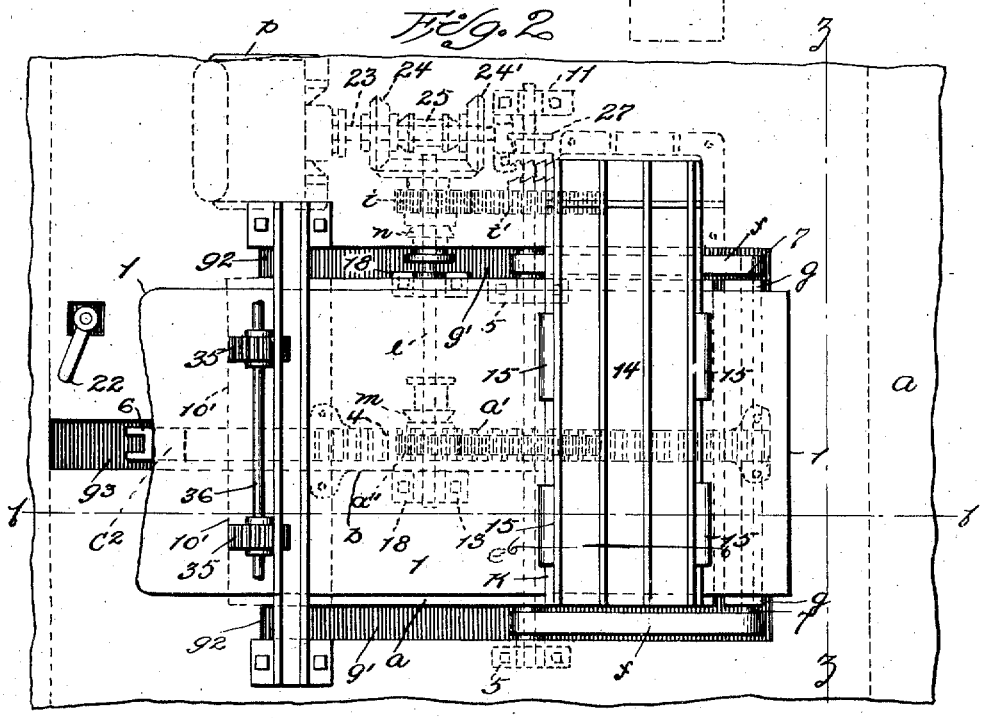
Fig. 2 is a top plan view of the same.

On the shaft *e*, at a suitable and equal distance from each side of the longitudinal center of the rack *c* and clear of the longitudinal edges of the metal-sheet 1, is fulcrumed and fixed one end of an arm or lever *f*, which is normally or initially inclined upwardly and forwardly from the shaft *e* toward the floor-plate *a*, where it it fixed, preferably at its outer free end, to the corresponding end of a spindle 7; and on the spindle 7 in proximity and parallel thereto, is hinged by lugs 8 projecting therefrom, a flat rectangular-shaped bar *g*, which extends lengthwise between, and at right angles to, the arms *f* and is free to move radially about its pivot or hinge 7, the bar *g*, by which the metal-sheet 1 is folded, as hereinafter described, being adapted to pass freely through a corresponding opening 9 therefor in the floor-plate *a*, across which opening the front end portion of the metal-sheet 1 extends, the upper face of the bar *g* bearing thereat against the under-side of the metal-sheet 1 when the latter is in its initial position on the floor-plate *a*, as seen in Figs. 1 and 2.

Longitudinally through the floor-plate *a* immediately over, and having its longitudinal edges clear of the corresponding sides of each arm $f$, is an opening $9'$, which extends rearwardly from the front opening 9 to a distance equal, or thereabout, to the travel of the arms $f$ when swung by the shaft $e$ from the initial position of the bar $g$, shown by full lines in Fig. 1, to its final position, shown by dotted lines in Fig. 1 and by full lines in Fig. 4, and as hereinafter more particularly referred to, the openings $9'$ communicating at their rear ends with an opening $9^2$ formed transversely through the floor-plate $a$ and communicating with a central longitudinal opening $9^3$ formed through the floor-plate $a$ clear of the sides of the offset $c^2$ of the rack $c$ and extending rearwardly for a suitable distance from the opening $9^2$ for allowing free movement of the offset $c^2$ to and fro according to the varying lengths of the metal-sheets to be doubled.

By the arrangement of the openings 9, $9'$, $9^2$ and $9^3$, thus described, it will be noted that the consequently detached intervening portion of the floor-plate $a$ is secured to the surrounding portion of the latter in front by a U-shaped bracket 10 (see particularly Fig. 1), which straddles the bar $g$ beneath the floor-plate $a$ and is fixed by one leg to the front end of the detached portion and by its other leg to the adjacent surrounding portion of the floor-plate $a$, and, similarly, at the rear end of the detached portion by U-shaped brackets $10'$, which bridge the opening $9^2$ at each side and clear the opening $9^3$, whereby the intervening portion of the floor-plate $a$ is firmly supported and held at the normal level of the floor.

$h$ represents a shaft which is preferably in alinement with, but separate from, the shaft $e$ and is mounted in suitable bearings 11 secured beneath to the foundation. On the shaft $h$, which is preferably in the present case fixed in the bearings 11, is mounted loosely a spur-wheel $i$, which is adapted to engage with a vertically arranged toothed rack 12 formed on or fixed to one side of the upright shank 13 of a horizontal rectangular-shaped plate 14, which projects longitudinally for a suitable distance from the upper end of the shank 13 above and across the floor-plate $a$ and the metal-sheet 1 thereon and carries the presser-plate $k$ by which the folded portion of the metal-sheet 1 is pressed downward upon the straight under portion thereof, as hereinafter particularly referred to, the combined shank 13 and plate 14 forming an inverted L-shaped member.

The presser-plate $k$ in the present case is formed along its longitudinal edges with upwardly projecting flanges 15, which are slidably in contact with the corresponding edges of the plate 14 and flanged inwardly at the top so as to overlap the latter, a suitable space 16 being left between the plate 14 and the upper side of the presser-plate $k$, and in the space 16 are placed transversely a series of springs 17 preferably fixed to the plate 14 and bearing at their free ends on the presser-plate $k$, whereby the presser-plate $k$ is vertically yieldable and resilient when lowered upon the folded portion of the metal-sheet 1.

For operating the machine, various arrangements of mechanism driven by a single motor or otherwise may be used, the driving gear for this purpose in the present case consisting of a counter shaft $l$ arranged parallel to the shafts $e$ and $h$ and rotatably mounted in suitable bearings 18. On the shaft $l$ is mounted loosely a spur-pinion $d'$ which is adapted to engage the spur wheel $d$ on the shaft $e$, and a spur pinion $i'$ adapted to engage the spur-wheel $i$ on the shaft $h$, and on the shaft $l$ is feathered a suitable clutch, such as a friction-clutch $m$, which is adapted to engage the pinion $d'$, and a similar clutch $n$ adapted to engage the pinion $i'$, the clutches $m$ and $n$ being controlled by a suitable system of levers, such as the levers $m'$ and $n'$, which are connected to each other by a link $o$ and the latter to a lever 19 having its outer free end adapted for engagement by a spur-pinion 20, which is fixed to an upright spindle 21 projecting through the floor-plate $a$ and provided above the latter with a handle 22 within reach of the operator.

$p$ represents a motor (Figs. 2 and 8) having its shaft 23 at right angles to the counter-shaft $l$, and on the motor shaft 23 are loosely mounted two opposite bevel wheels 24, $24'$, which are adapted to engage with a bevel wheel 25 fixed on the adjacent end of the shaft $l$.

On the motor shaft 23, between the bevel wheels 24, $24'$, is feathered a clutch 26, which is adapted for engagement with either of the bevel wheels 24, $24'$, and controlled by a lever $26'$ or otherwise by any suitable well-known means. On the fixed shaft $h$, is also feathered a clutch 27, which is adapted for engagement with the spur-wheel $i$ for locking, and so preventing rotation of, the latter by the tendency of the presser-plate $k$ and its appendages to descend by gravity when the spur-wheel $i$ is thrown out of gear with the driving mechanism in the operation of the machine; or in lieu of the clutch 27 for this purpose, an ordinary pulley and band-brake may be used.

Figure 8:
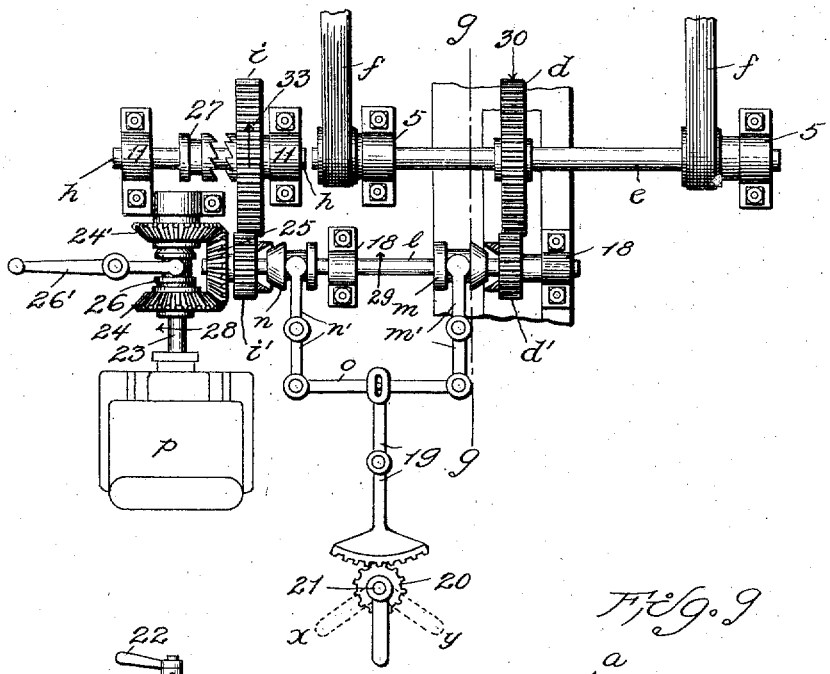
Fig. 8 is a top plan view of the driving-gear of the machine detached from the general views.
Figure 9:
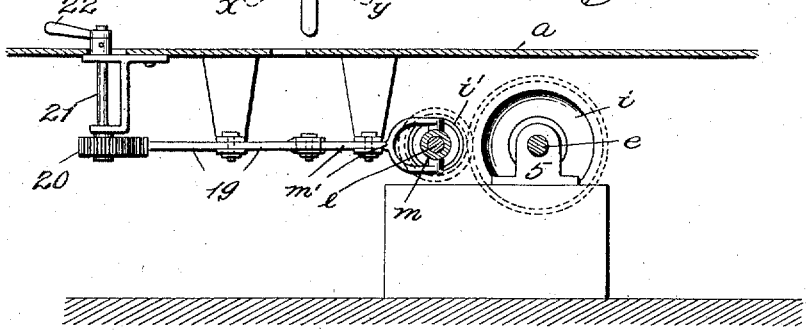
Fig. 9 is a vertical section through the same taken longitudinally with the machine on line 9—9, Fig. 8.

In operation, assuming the metal sheet 1 to be placed on the floor-plate $a$ in its initial position, as shown by the heavy black line in Figs. 1 and 3, and by ordinary full lines in Fig. 2, and that the motor shaft 23 is rotated in the direction of arrow 28 (Fig. 8) with the clutch 26 thrown into engagement with the bevel wheel 24, the bevel wheel 25 and with it the counter-shaft $l$ will be rotated in the direction of arrow 29, when the clutch $m$ being thrown into engagement with the pinion $d'$ by moving the operating-handle 22 from its mid-position as shown in Fig. 8, into the dotted position $x$, the spur-wheel $d$ and its shaft $e$ will be rotated in the direction of arrow 30 (Figs. 8 and 1) and in so doing will raise and swing the doubling-bar $g$ from its initial position seen in Fig. 1, as indicated by arrow 31, or so as to raise the metal-sheet 1 at its front end; simultaneously, the rack $c$ with its offset $c^2$ engaging the metal sheet 1 at its rear end is moved forward by the spur-wheel $d$ in the direction of arrow 32, and in so doing causes the metal-sheet 1 to be moved forward along the floor-plate $a$, the combined and simultaneous movements of the doubling-bar $g$ and rack $c$ from their initial positions shown by full lines in Fig. 1 to their final positions indicated by dotted lines in Fig. 1 and by full lines in Fig. 4, thereby causing the metal-sheet 1 to be folded over on itself into the position and shape indicated by dotted lines in Fig. 1.

By then moving the handle 22 of the driving-gear into the mid-position as shown by full lines in Fig. 8, the clutch $m$ will be disengaged from the pinion $d'$, and the motor $p$ being then stopped, the clutch 26 is disengaged from the bevel wheel 24 and thrown into engagement with the bevel wheel 24′, the clutch $n$ being at the same time thrown into engagement with the pinion $i'$ by moving the handle 22 into the dotted position $y$ and the locking-clutch 27 released from the spur-wheel $i$, when the motor $p$ being again re-started, the bevel wheel 25, and with it the counter-shaft $l$ and pinion $i'$ will be rotated in the direction of arrow 33 (Fig. 8) or so as to lower the members 13, 14, and with them the presser-plate $k$ from its position shown, by full lines in Figs. 1 and 3, on to the metal-sheet 1 until the folded portion of the latter is flattened and pressed downward upon the underlying portion thereof as shown in Fig. 4, thereby doubling the sheet or producing a pack for re-rolling, and in this connection it is to be noted that, by means of the springs 17 before described, the impact of the presser-plate $k$ upon the metal-sheet 1 is cushioned.

The motor $p$ being then again stopped, the clutch 26 is disengaged from the bevel wheel 24′ and reëngaged with the bevel wheel 24, which on re-starting the motor $p$ causes the spur-wheel $i$ to be rotated in the opposite direction from arrow 33, or so as to raise the presser-plate $k$ from the metal-sheet 1 into its original position. The motor $p$ is then again stopped and the spur-wheel $i$ locked by the clutch 27, when by disengaging the clutch $n$ from the pinion $i'$ and reëngaging the clutch $m$ with the pinion $d'$, the spur-wheel $d$ on re-starting the motor $p$ will be rotated in the opposite direction to arrow 30, or so as to return the doubling-bar $g$ and rack $c$ to their original position, when the doubled sheet is removed.

In the meantime, however, previous to re-starting the motor $p$ and returning the parts as last mentioned, the shearing blade $s$ (see Figs. 1, 3, and 4) carried by the vertically arranged toothed racks 34, which are operated by the toothed pinions 35 fixed on a shaft 36 mounted in bearings 37 at the sides of the standard 38, is lowered and, passing between the vertical leg 6 of the offset $c^2$ and the reinforced forward edge of the opening $9^2$ shears or trims the irregular rear end edges 39 of the doubled sheet 1, the shearing mechanism referred to being of the ordinary well-known construction and therefore needing no further description.

My new machine will accommodate sheets of varying length, and it will now be evident that, due to the folding or doubling bar $g$ and sheet-sliding member $c^2$, and their combined and substantially simultaneous movements with respect to the sheet being folded or doubled, the two opposite edges of the sheet, irrespective of the length of the particular sheet, within the limits of the machine, are first brought substantially into alinement and then held in alinement during the pressing and flattening action of the presser-plate $k$. The sheet is thus automatically and most efficiently approximately exactly doubled or folded upon itself and waste of the sheet thereby avoided, the later action of the shearing-blade $s$ being merely to simultaneously trim, and thereby even, the said two edges of the folded sheet.

I am aware that changes in the form, construction, arrangement, and combination of the several parts of my machine may be made and substituted for those herein shown and described without departing from the nature and principle of my invention.

Having thus described my invention, what I claim and desire to secure by Letters Patent is:

1. A sheet-metal doubling machine comprising, in combination, means including a member adapted for engagement with the sheet for folding the sheet upon itself, a second member adapted for engagement with the sheet for slidably moving the sheet, and means for effecting sheet-sliding movement of the second member during and approximately throughout folding-movement of the first member for bringing the ends of the folded sheet substantially in alinement at the end of the folding movement of the first member.

2. A sheet-metal doubling machine comprising a table, in combination with means including a member adapted for engagement with the sheet for folding the sheet upon itself upon the table, a second member adapted for engagement with the sheet for slidably moving the sheet upon the table, and means for effecting sheet-sliding movement of the second member approximately simultaneously with and throughout folding-movement of the first member for bringing the ends of the folded sheet substantially in alinement at the end of the folding movement of the first member.

3. A sheet-metal doubling machine comprising a table, in combination with means including a member adapted for engagement with an end of the sheet for folding the sheet upon itself upon the table and means including a movable rack and a member carried by the rack adapted for engagement with the other end of the sheet for sliding the sheet upon the table during the folding movement of the first member, the sliding movement of the rack and second member beginning substantially simultaneously with, and continuing substantially throughout, the folding movement of the first member, whereby the two ends of the folded sheet are brought substantially in alinement at the end of the folding movement of said first member.

4. A sheet-metal doubling machine comprising a table, in combination with means including a member adapted for engagement with an end of the sheet for folding the sheet upon itself upon the table, and means including a movable rack and a member carried by the rack adapted for engagement with the other end of the sheet for sliding the sheet upon the table during the folding movement of the first member, the sliding movement of the rack and second member beginning substantially simultaneously with, and continuing substantially throughout, the folding movement of the first member, whereby the two ends of the folded sheet are brought and held substantially in alinement at the end of the folding movement of the first member, and means for then pressing and flattening the folded sheet upon itself.

5. A sheet-metal doubling machine comprising a table, in combination with means including a member adapted for engagement with an end of the sheet for folding the sheet upon itself upon the table, and means including a movable rack and a member carried by the rack adapted for engagement with the other end of the sheet for sliding the sheet upon the table during the folding movement of the first member, the sliding movement of the rack and second member beginning substantially simultaneously with, and continuing substantially throughout, the folding movement of the first member, whereby the two ends of the folded sheet are brought and held substantially in alinement at the end of the folding movement of the first member, means for then pressing and flattening the folded sheet upon itself, and shearing-means for trimming simultaneously the said two ends of the folded and pressed sheet.

6. A sheet-metal doubling machine comprising a table, in combination with means including a member adapted for engagement with an end of the sheet for folding the sheet upon itself upon the table, means including a member adapted for engagement with the other end of the sheet for sliding the sheet upon the table during the folding movement of the first member, whereby the two ends of the sheet are brought and held substantially in alinement at the end of the folding movement of the first member, means for then pressing and flattening the folded sheet upon itself, and means including a shearing-blade reciprocatory between the first and second members when at the end of their respective travel for trimming simultaneously the said two ends of the folded and pressed sheet.

7. A sheet-metal doubling machine comprising, in combination, a table, an arm swingable relatively to the table and adapted for engagement with an end of the sheet for folding the sheet upon itself upon the table, a second arm adapted for engagement with an opposite end of the sheet for slidably moving the sheet on the table, means for effecting swinging movement of the first arm, and means for effecting sheet-sliding movement of the second arm during and approximately throughout folding-movement of the first arm for bringing the opposite ends of the sheet substantially in alinement at the end of the folding movement of the first arm.

8. A sheet-metal doubling machine comprising, in combination, a rotatable shaft, means having fixed engagement with the shaft including a member adapted for engagement with an end of the sheet to fold the sheet upon itself, a movable rack, a member carried by the rack and adapted for engagement with the other end of the sheet, and gearing between the shaft and rack for moving the rack and its carried member to slide the sheet during the folding movement of the first member.

9. A sheet-metal doubling machine comprising, in combination, a sheet supporting-table, a rotatable shaft located beneath the table, means having fixed engagement with the shaft including a member adapted for engagement with an end of the sheet to fold the sheet upon itself upon the table, a movable rack also located beneath the table, an arm on the rack adapted for engagement with the other end of the sheet, and a toothed wheel on the shaft having engagement with the rack for moving the rack and its said arm to slide the sheet horizontally on the table during the folding movement of the first member.

10. In a sheet-metal doubling machine, the combination of a floor adapted to support the said sheet, a rotatable shaft arranged beneath the floor transversely to the sheet, a toothed wheel fixed on the shaft, a toothed rack adapted to be engaged by the said wheel and having a suitable member adapted to bear against the rear end of the sheet, an arm fixed at one end to the shaft and adapted at its other end to bear against the under-side of the sheet, means for rotating the shaft, and means for pressing and flattening the folded portion of the sheet on to the underlying portion thereof.

11. In a sheet-metal doubling machine, the combination of a floor adapted to support the said sheet, a rotatable shaft arranged beneath the floor transversely to the sheet, a toothed wheel fixed on the shaft, a toothed rack adapted to be engaged by the said wheel and slidable longitudinally in a plane parallel to the floor, the said rack having a suitable member adapted to bear against the rear end of the sheet, an arm fixed at one end to the shaft at each side of the said wheel, a bar hinged to, and extending between the said arms at a suitable distance forward from the shaft, the said bar bearing thereat against the under-side of the sheet, means for rotating the shaft, and means for pressing and flattening the folded portion of the sheet on to the underlying portion thereof.

12. In a sheet-metal doubling machine, the combination of a floor adapted to support the said sheet, a rotatable shaft arranged beneath the floor transversely to the sheet, a toothed wheel fixed on the shaft, a toothed rack adapted to be engaged by the said wheel and slidable longitudinally in a plane parallel to the floor, the said rack having a suitable member adapted to bear against the rear end of the sheet, an arm fixed at one end to the shaft at each side of the said wheel, a bar hinged to, and extending between the said arms at a suitable distance forward from the shaft, the said bar bearing thereat against the under-side of the sheet, means for rotating the shaft, a presser-plate, and means for raising and lowering the said plate on to and from the folded portion of the sheet respectively.

13. In a sheet-metal doubling machine, the combination of a floor adapted to support the said sheet, a rotatable shaft arranged beneath the floor transversely to the sheet, a toothed wheel fixed on the shaft, a toothed rack adapted to be engaged by the said wheel and slidable longitudinally in a plane parallel to the floor, the said rack having a suitable member adapted to bear against the rear end of the sheet, an arm fixed at one end to the shaft at each side of the said wheel, a bar hinged to and extending between the said arms at a suitable distance forward from the shaft, the said bar bearing thereat against the under side of the sheet, a shaft, a toothed wheel on the last-named shaft, a presser-plate, a member adapted to carry and to lower and raise the said plate on to and from the folded portion of the sheet respectively, a toothed rack carried by the said member and adapted to be engaged by the last-named wheel, and means for rotating the said wheels independently of each other.

In witness whereof, I have signed my name to this specification.

JOHN G. GRAHAM.